(12) United States Patent
Shen et al.

(10) Patent No.: US 10,005,406 B2
(45) Date of Patent: Jun. 26, 2018

(54) ATTACHMENT SLEEVE AND VEHICLE INTERIOR TRIM EMPLOYING THE SAME

(71) Applicant: Ford Global Technologies, LLC, Dearborn, MI (US)

(72) Inventors: Kevin Shen, Nanjing (CN); Shibao Fu, Nanjing (CN); Wei Xu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 15/365,408

(22) Filed: Nov. 30, 2016

(65) Prior Publication Data
US 2017/0174151 A1 Jun. 22, 2017

(30) Foreign Application Priority Data
Dec. 18, 2015 (CN) .......................... 2015 1 0959298

(51) Int. Cl.
*B60R 13/02* (2006.01)
*B60Q 3/54* (2017.01)
*F16B 2/20* (2006.01)
*F16B 5/06* (2006.01)

(52) U.S. Cl.
CPC ............ *B60R 13/0206* (2013.01); *B60Q 3/54* (2017.02); *B60R 13/02* (2013.01); *B60Q 2500/10* (2013.01); *B60R 2013/0287* (2013.01); *F16B 2/20* (2013.01); *F16B 5/0635* (2013.01)

(58) Field of Classification Search
CPC ... B60Q 3/00; B60Q 3/50; B60Q 3/51; B60Q 3/54; B60R 13/02; F16B 2/20
USPC ........................................................ 296/1.08
See application file for complete search history.

(56) References Cited

U.S. PATENT DOCUMENTS

| | | |
|---|---|---|
| 5,239,449 A | 8/1993 | Wnuk et al. |
| 5,357,408 A | 10/1994 | Lecznar et al. |
| 5,441,339 A | 8/1995 | Mathias et al. |
| 6,364,512 B1 | 4/2002 | Logel |
| 7,300,189 B2 | 11/2007 | England et al. |
| 2002/0195844 A1 | 12/2002 | Hipwell |

*Primary Examiner* — Jason S Daniels
(74) *Attorney, Agent, or Firm* — Vichit Chea; Mohr IP Law Solutions, PC

(57) ABSTRACT

An attachment sleeve to attach an article to a base comprises first and second walls connected to each other with a first wall angle there-between, a first connector extending from the first wall and including a first head, a foot and a first neck positioned there-between along a depth direction, and a second connector extending from the second wall and including a second head, a second foot and a second neck positioned there-between along the depth direction. The first neck is more bendable than the second neck.

20 Claims, 4 Drawing Sheets

ATTACHMENT SLEEVE AND VEHICLE INTERIOR TRIM EMPLOYING THE SAME

RELATED APPLICATION

This application claims the benefit of Chinese Patent Application No. CN 201510959298.3, filed on Dec. 18, 2015, the entire contents thereof being incorporated herein by reference.

TECHNICAL FIELD

The present invention relates to an attachment sleeve to attach an article to a base, and a vehicle interior trim employing the same.

BACKGROUND

Automotive interior components such as dome lamps are often mounted onto an overhead trim for ease of use and versatility. U.S. Pat. No. 5,239,449 discloses a snap lock arrangement via which the dome lamp is mounted onto the overhead trim.

SUMMARY

In one or more embodiments, the present invention provides an attachment sleeve to attach an article to a base, where the attachment sleeve includes first and second walls connected to each other with a first wall angle there-between, a first connector extending from the first wall and including a first head, a foot and a first neck positioned there-between along a depth direction, and a second connector extending from the second wall and including a second head, a second foot and a second neck positioned there-between along the depth direction, the first neck being more bendable than the second neck.

In another or more embodiments, the present invention provides a vehicle interior trim attachment sleeve assembly, which includes an interior trim base, first and second walls connected to each other with a first wall angle there-between, a first connector extending from the first wall and including a first head, a first foot and a first neck positioned there-between along a depth direction; and a second connector extending from the second wall and including a second head, a second foot and a second neck positioned there-between along the depth direction, the first neck being more bendable than the second neck, the first head being spaced apart from the interior trim base at a first operating position and contacting the interior trim base at a second operating position, the interior trim base being partially received between the first head and the first foot when the first head is at the second operating position.

One or more advantageous features as described herein are believed to be readily apparent from the following detailed description of one or more embodiments when taken in connection with the accompanying drawings.

DETAILED DESCRIPTION OF ONE OR MORE EMBODIMENTS

Figure 1:
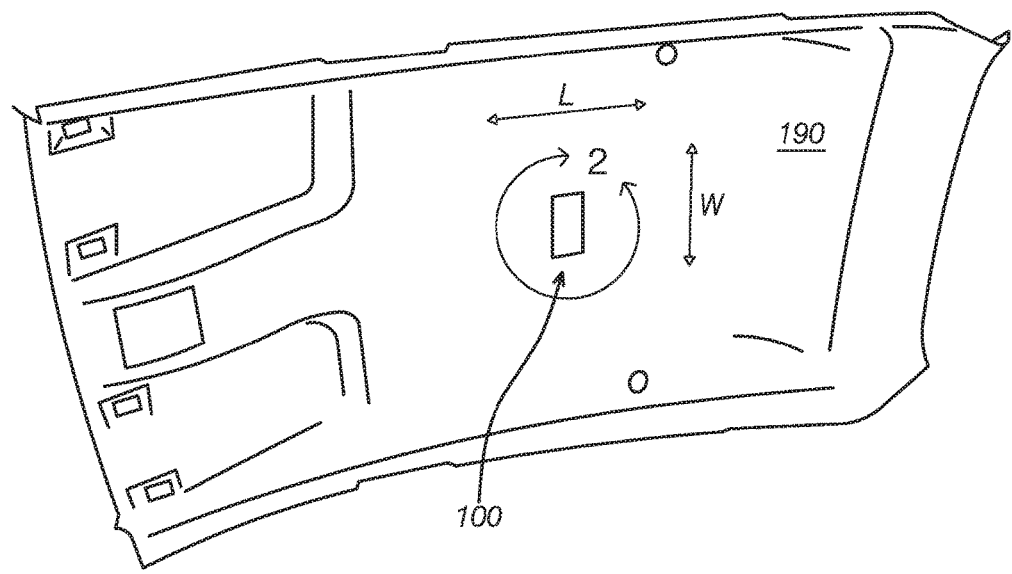
FIG. 1 illustratively depicts a front view of an attachment sleeve as positioned relative to a base in one or more embodiments.

As referenced in the figures, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

The present invention in one or more embodiments is believed to be advantageous in at least providing an attachment sleeve via which an article may be readily attached to a base, with relatively enhanced aesthetical appeal. In particular, and as mentioned herein elsewhere, the attachment sleeve may be provided with one or more side connectors, each with a flexible neck which in a first operating position facilitates positioning of the attachment sleeve onto the base, and in a second operating position facilitates attachment of the article onto the attachment sleeve itself.

Figure 2:
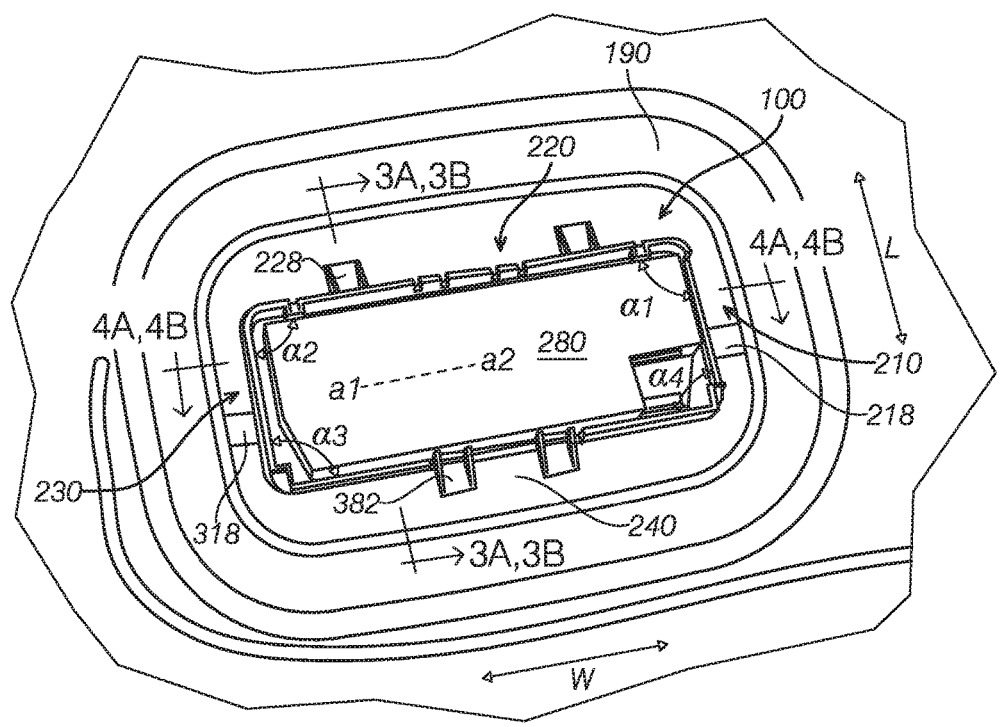
FIG. 2 illustratively depicts an enlarged, back view of the attachment sleeve referenced in FIG. 1.
Figure 3A:
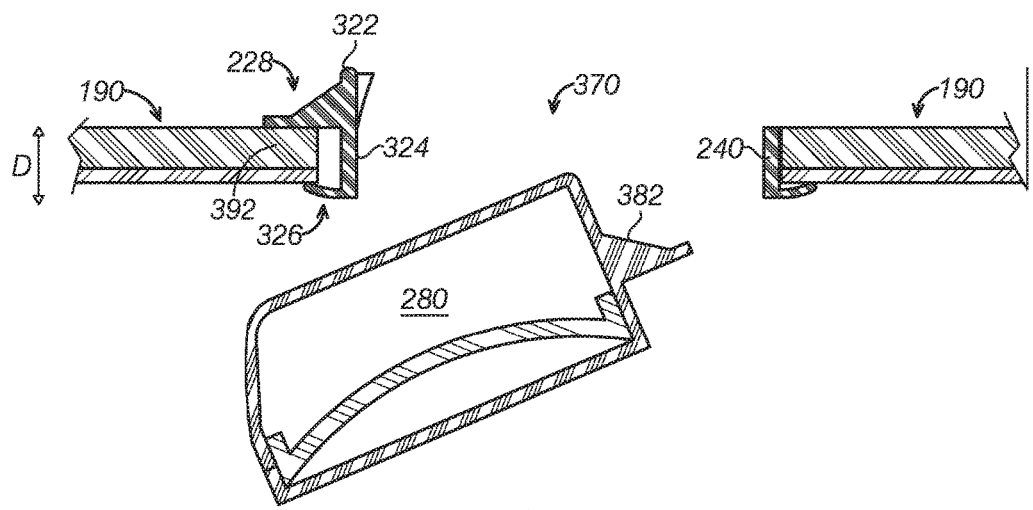
FIG. 3A illustratively depicts a cross-sectional view of the attachment sleeve referenced in FIG. 2, taken along line 3A-3B, in preparation for attaching an article to the base.
Figure 3B:
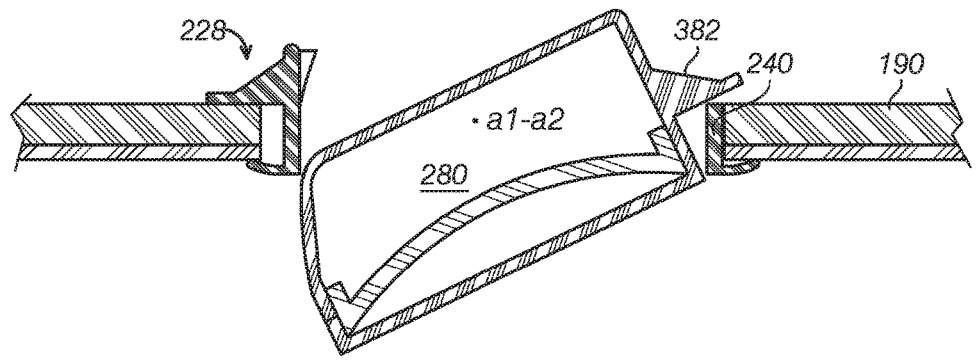
FIG. 3B illustratively depicts another cross-sectional view of the attachment sleeve referenced in FIG. 3A.
Figure 3C:
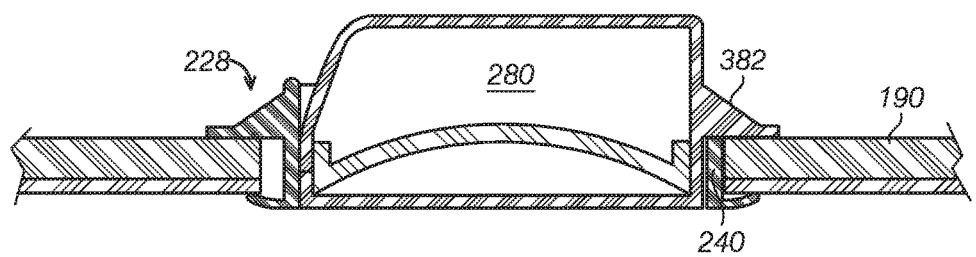
FIG. 3C illustratively depicts yet another cross-sectional view of the attachment sleeve referenced in FIG. 3A.
Figure 4A:
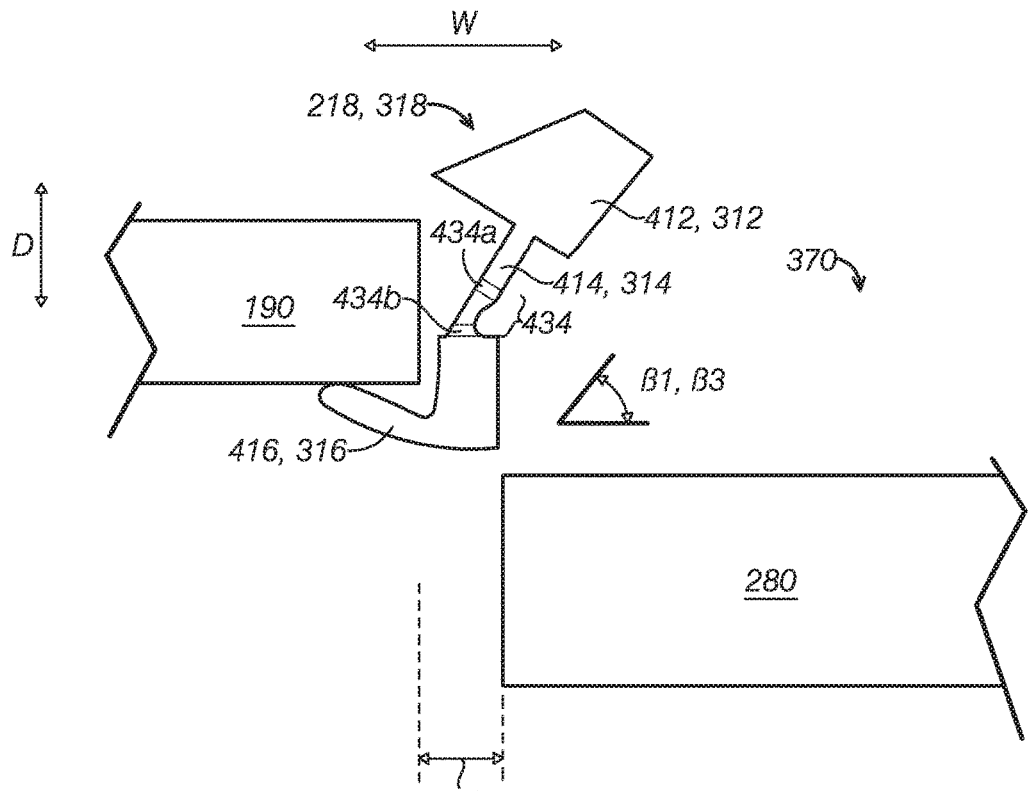
FIG. 4A illustratively depicts a cross-sectional view of the attachment sleeve referenced in FIG. 2, taken along line 4A-4B.

In one or more embodiments, and with reference to FIG. 1 and further in view of FIG. 2, FIG. 3 and FIG. 4A, an attachment sleeve generally shown at 100 is provided to attach an article 280 to a base 190, where the attachment sleeve 100 includes first and second walls 210, 220 connected to each other with a first wall angle $\alpha 1$ positioned there-between. In one or more embodiments, the first wall angle $\alpha 1$ is greater than zero and no more than 90 degrees. The first wall 210 includes a first connector 218 for attachment to the base 190 and the second wall 220 includes a second connector 228 for attachment to the base 190. Referring to FIG. 4A, the first connector 218 includes a first head 412, a first foot 416 and a first neck 414 positioned between the first head 412 and the first foot 228 along a depth direction D. Referring to FIG. 3A, the second connector 228 includes a second head 322, a second foot 326 and a second neck 324 positioned between the second head 322 and the second foot 326 along the depth direction D.

The first neck 414 of the first connector 218 may be more bendable than the second neck 324 of the second connector 228. In one or more embodiments, bendability may alternatively be referred to as flexibility or pliability, which is opposite of or complementary to stiffness, in that the more flexible an object is, the less stiff it is. Stiffness may be the rigidity of the object, or the extent to which it resists deformation in response to an applied force. Bendability may be determined via any suitable method, for instance, by measuring a stiffness value of the object. By way of non-limiting example, a stiffness k of a material may be a measure of the resistance offered by the object to deformation. In particular, and for an object with a single free degree of freedom, for instance, stretching or compression of a rod, the stiffness may be defined as:

$$k=F/\delta$$

where F is the force applied on the object, δ is the displacement produced by the force along the same free degree of freedom, for instance the change in length of the stretched spring. For an object with multiple degrees of freedom, the targeted degree of freedom is unconstrained while the remaining or other degrees of freedom may be restrained. Under such a condition, the above equation may be used to obtain the stiffness and hence the bendability for the degree of freedom which is not constrained. In general, a plastic material may be considered more bendable than a metallic material, and within the plastic material family, a thermoplastic member may be more bendable or flexible than a thermoset member.

In some embodiments, and further in view of FIG. 4A, a bending enabler 434 such as a hinge, a spring or a clip may be employed within the first neck 414, for instance at a location 434a, and/or between the first neck 414 and first foot 416, for instance at a location 434b to effectuate bending of the first neck 414 relative to the first foot 416 along a width direction W. In some embodiments, a hinge may be employed at the location 434a and a different form of the bending enabler 434 such as a spring or a clip may be employed at the location 434b, vice versa.

Figure 4B:
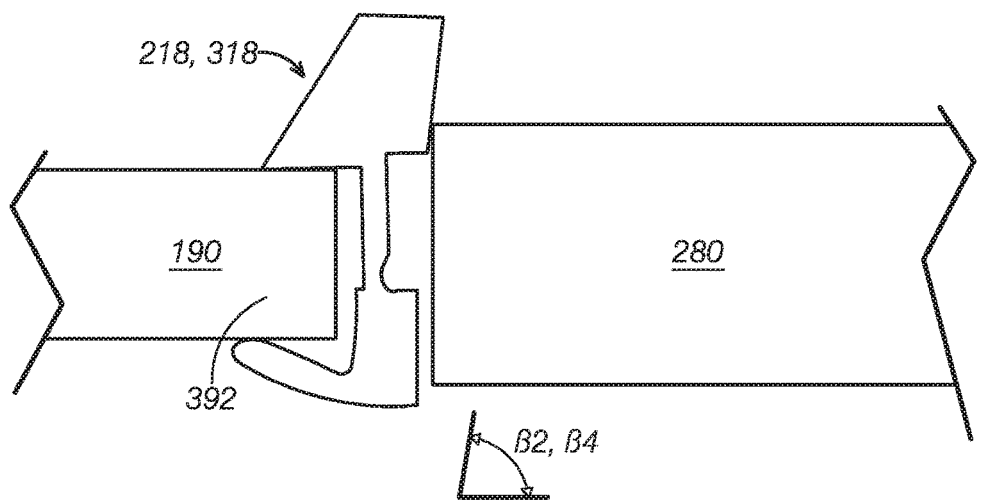
FIG. 4B illustratively depicts another cross-sectional view of the attachment sleeve referenced in FIG. 4A.

Referring back to FIG. 4A and further in view of FIG. 4B, the first neck 414 may be bendable to facilitate movability of the first head 412 relative to the first foot 416 along the width direction W such that the first head 412 may be bent toward an aperture 370. In some embodiments, the attachment sleeve 100 may be mounted to the base 190 by passing through the aperture 370 and positioning the second connector 228 over the base 190 (see FIGS. 2 and 3A). As the second connector 228 extends from the second wall 220, the attachment sleeve 100 needs to rotate along an axis a1-a2 in order to position the second connector 228 over the base 190. Because the first head 412 is bent toward the aperture 370 as shown in FIG. 4A, the first connector 218 will not extend over the aperture 370 and thus will not interfere the engagement of the attachment sleeve 100 with the base via the second connector 228. Once the attachment sleeve 100 is at least temporarily positioned onto the base 190 via the second connector 228, the article 280 may then enter through the aperture 370. As detailed herein elsewhere, such entry may function, quite naturally, to push the first head 412 of the first connector 218 away from the aperture 370 and toward the base 190. With this repositioning, the first head 412 may rest upon the base 190 in a configuration such as one illustratively depicted in FIG. 4B. In this way, the attachment sleeve 100 is further engaged with the base 190 by the first connector 218.

One of the benefits of the first connector 218 and the first neck 414 in particular is that the design of the first neck 414 being relatively more bendable facilitates the attachment of the article 280 onto the base 190 while effectively reducing the unpleasant exposure through a gap 450 that is often unavoidable due to the nature of cutting, workmanship and installation. For instance, and by providing a suitable mount of clearance, gap 450 may also be necessary to facilitate the up-mount of the attachment sleeve 100 via the second wall 220. However, that amount of clearance in the form of the gap 450 may not be aesthetically pleasant if not covered from a plain view. The first foot 416 may do just that covering. However, covering structure including the first foot 416 may add unnecessary weight to the attachment sleeve 100. Accordingly, the first connector 218 with the bendable first neck 414 is believed to be advantageous at least in that the first head 412 may work in concert with the first foot 416 to at least receive therein a portion of the base 190 to provide enhanced structural integrity and balance some weight resulting from the first foot 416 by attaching the first head 412 to the base 190. Yet, the first connector 218 does not have to interfere the up-mount of the attachment sleeve 100 via the second connector 228.

Referring back to FIG. 4A, where the first connector 218 is shown at a first operating position, with the first neck 414 bent away from the base 190. At this position, the first neck 414 and the first head 412 supported thereupon are not expected to interfere with the attachment of the second wall 220 onto the base 190 via the second connector 228 even though the attachment sleeve 100 is likely to include a rotational or pivoting movement of the attachment sleeve 100 about an axis a1-a2, extending along the width direction W. On the other hand, the first connector 218 and in particular its first head 412 is likely to be in the way when the attachment sleeve rotates about the axis a1-a2 into the aperture 370 if the first head 412 has not first been moved away from contacting the base 190.

With further reference to FIG. 4B, the first connector 218 is shown at a second operational position. At this second operational position, the article 280 is now fully seated onto the first wall 210, which is delayed in time and is at this position after the article 280 has previously been seated onto the second wall 220. The first head 412 is of a first head angle 131 relative to the first foot 416 when the attachment sleeve 100 is at the first operating position as illustratively depicted in FIG. 4A and the first head 412 is of a second head angle β2 relative to the first foot 416 when the first attachment sleeve 100 is at the second operating position as illustratively depicted in FIG. 4B. The first head angle β1 is different from the second head angle β2, and particularly that β2 is closer than β1 to be a 90-degree angle or a right angle. In a non-limiting example, the second head angle β2 may be in a range of 75 to 85 degrees while the first head angle β1 may be in a range of 35 to 65 degrees. The first head 412 is spaced apart from the base 190 at the first operating position and contacts the base 190 at the second operating position. As illustratively depicted in FIG. 4B, a portion of the base 190, such as portion 392 is received between the first head 412 and the first foot 416 when the first head 412 is at the second operating position.

Referring back to FIG. 4A, and further in view of FIG. 4B, one or more of the first foot 416, the first neck 414 and the first head 412 may be made integral to the first wall 210, in material and/or construction. In one or more embodiments, the first head 412, the first neck 414 and the first foot 416 may each be a part of an integral one-piece. In other embodiments, the first head 412, the first neck 414, the first foot 416 and the first wall 210 may each be a part of an integral one-piece. Any suitable processing method may be used to form an integral part or component, with non-limiting examples thereof including a molding process.

Figure 5A:
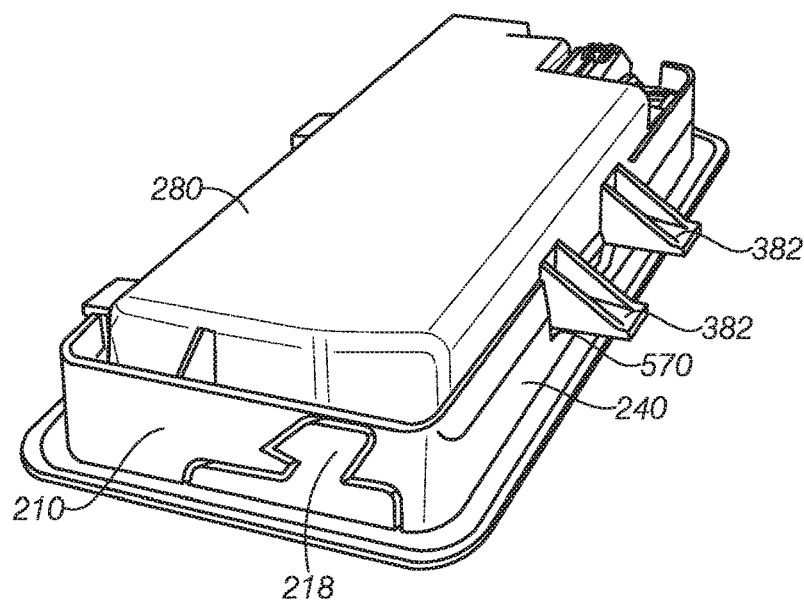
FIG. 5A illustratively depicts a perspective view of the attachment sleeve referenced in FIG. 1.

For instance, and with continuing reference to FIG. 5A, and in one or more embodiments, the first head 412 and the first neck 414 may each be a carved-out structure after the first wall 210 has been previously formed. Such configuration offers material continuity and structural integrity that may be cost effective and labor efficient. This structure may be particularly beneficial to deliver packaging efficiencies in transportation and storage that are post production and prior to actual usage, and further to arrive at the first operating position via effectuating rotation of the first head 412 and the first neck 414 along the depth direction D.

Figure 5B:
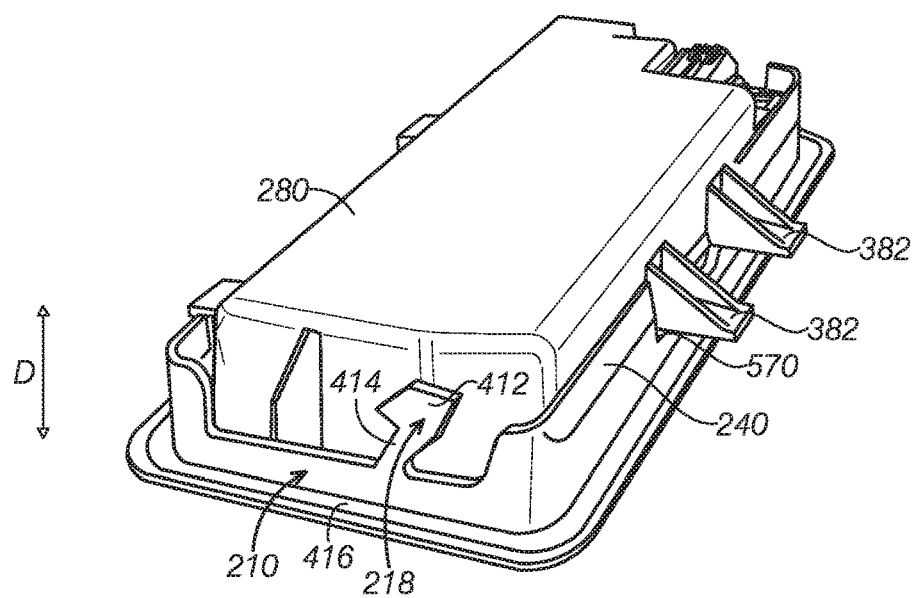
FIG. 5B illustratively depicts another perspective view of the attachment sleeve referenced in FIG. 1.

As illustratively depicted in FIG. 5B, and in one or more embodiments, the first wall 210 is smaller in height along the depth direction D than the second wall 210, and is integrally formed with the first head 412 and the first neck 414 at an upper edge of the first wall 210.

In one or more embodiments, and to facilitate the rotation or pivoting, the first neck 414 of the first connector 218 referenced in FIG. 4A-4B and FIG. 5A-5B is smaller in cross-sectional dimension relative to at least one of the first foot 416 and the first head 412.

To impart flexibility and bendability to the first neck 414, the first neck 414 may include any suitable material such as a thermoplastic polymer. Without wanting to be limited to any particular theory, it is believed that the thermoplastic material is more moldable, either via injection or compression, and may be reshaped after use. Non-limiting examples of such a thermoplastic polymer may include polypropylene, polycarbonate, acrylic, nylon, polyactic acid and polybenzimidazole. In relatively low usage of the attachment sleeve, such as when the article 280 is only attached onto and detached from the base 190 once in a while or not detached after an attachment, the first neck 414 may include or be formed of a material having less resistance to fatigue and therefore costs associated with using material with better resistance to fatigue may likely be reduced. However, in instances where a need for attaching and detaching of the attachment sleeve 100 arises more frequently, the first neck 414 and even the entire first connector 218 may include or be formed of a better fatigue-resistant material, with non-limiting examples thereof including nylon. In situation where, when as needed, the entire attachment sleeve including the first neck 414 may employ a flexible material, and the strength may further be enhanced by suitable methods, with non-limiting example thereof including to use a blend of the thermoplastic material and other strength-enhancing polymers.

Referring back to FIG. 4A, and further in view of FIG. 4B, the first foot 416 is designed and believed to provide an at least partial covering of the gap 450 and hence provide an enhanced aesthetic appeal of a resulting attachment. The first head 412 is to contact and at least partially rest upon the base 190 at the second operating position such as the position illustratively depicted in FIG. 4B. At the second operating position, the first head 412 and the first foot 416 together form a pocket to receive therein a portion of the base 190 and accordingly to provide additional stability of the resulting attachment by clamping the base 190 at the first wall 210.

Referring back to FIG. 2, and in view of FIGS. 4A and 4B, the attachment sleeve 100 may further include a third wall 230 positioned at a second wall angle α2 relative to and contacting the second wall 220. In one or more embodiments, the second wall angle α2 is greater than zero and no more than 90 degrees. The third wall 230 may be opposite of the first wall 210 along the width direction W and may include one or more third connectors 318 similar to the first connector 218 of the first wall 210. The third connector 318 extends from the third wall 230 and includes a third head 312, a third foot 316 and a third neck 314 positioned there-between along the depth direction D. The third neck 314 of the third connector is more bendable than the second neck 324 of the second connector. Because the third wall 230 may be constructed similarly, reference numerals 312, 314, 316 and 318 are indicated in FIG. 4A for the sake of brevity. However, even when the first and third walls 210 and 230 may be similarly constructed and configured, they may still differ from each other in various aspects.

Referring to FIG. 2 and FIGS. 5A and 5B, the attachment sleeve 100 may further include a fourth wall 240 positioned at a fourth wall angle α4 relative to and contacting the first wall 210, and/or at a third wall angle α3 relative to the third wall 230 and contacting the third wall 230. The fourth wall 240 may include one or more recesses 570 to receive there-through and to therefore support one or more noses 382 of the article 280. The third head 312 is positioned at a third head angle β3 relative to the third foot 316 when the attachment sleeve 100 is at the first operating position as illustratively depicted in FIG. 4k and the third head 312 is positioned at a fourth head angle β4 relative to the third foot 316 when the attachment sleeve 100 is at the second operating position as illustratively depicted in FIG. 4B. The third head angle β3 is different from the fourth head angle β4.

A non-limiting example process of attaching the article 280 ultimately onto the base 190 may be described with particular reference to FIG. 3A through 3C, FIG. 4A to FIG. 4B and in view of FIG. 5A to FIG. 5B. At the view illustratively depicted in FIG. 3A, the attachment sleeve 100 has been attached to the base 190 at the second wall 220 via the second connector 228. More than one of the second connector 228 may be used on the second wall 220 to effectuate the up-mount of the attachment sleeve 100 onto the base 190. The second connector 228 may be configured to be similar to the first connector 218 of the first wall 210, for instance to include the second head 322, the second foot 326 and the second neck 324 positioned there-between. However, for a cost saving purpose, the second neck 324 does not need to be as flexible and bendable as the first neck 414 of the first connector 218, and therefore this is no additional requirement to impart enhanced flexibility and/or bendability to the second neck 324. Under such configuration, the second neck 324 may be less flexible and/or bendable than the first neck 414.

To attach the attachment sleeve 100 onto the base 190, an operator may position the edge portion 392 of the base 190 to be received between the second head 322 and the second foot 326 such that the attachment sleeve 100 is then at least temporarily stabilized or attached onto the base 190 along the depth direction D in preparation for the next step of installation process. It is noted that at a time prior to a full engagement of the attachment sleeve 100 relative to the base 190 at the second wall 220, the first head 412 of the attachment sleeve 100 at the first wall 210 has already been set at the first operating position such as a position illustratively depicted in FIG. 4A such that the presence of the first head 412 does not interfere with any rotation or pivoting movement of the attachment sleeve 100 about axis a1-a2 in the engagement process of the second connector 228 and the base 190.

Corresponding to the view illustratively depicted in FIG. 3B-3C and with further reference to FIG. 5B), the article 280 enters the aperture 370 optionally via rotation about the axis a1-a2 so as to position and align its nose 382 for an ultimate engagement with the base 190 via the recess 570 of the fourth wall 240.

Because it is intended to limit the space available within the aperture 370 to reduce any unwanted space such as the gap 450, the article 280 may also need to rotate and/or pivot about the axis a1-a2 as the article 280 moves into the aperture 370 for the engagement of the nose 382 to the base 190. Before, during and/or after the rotating and/or pivoting movement, the article 280 also enters along the depth direction D in preparation for an ultimately full entry into the aperture 370. During a movement along the depth direction D, the article 280 pushes the first head 412 toward the base 190 to make the first head 412 arrive at the second operating position depicted in FIG. 4B. Accordingly, without any additional operation, the first connector 218 engages the base 190 while the article 280 is being up-mounted, and therefore enhanced assembly efficiency can be achieved. At this position, the article 280 may rest against the first connector 218 of the first wall 210 and the second connector 228 of the second wall 220, and be attached to the base 190 via an attachment of the nose 382 to the base 190 at the fourth wall 240.

Although two walls additional to the first and second wall 210, 220 are illustratively depicted in FIG. 2, the attachment sleeve 100 may include more or fewer than two walls additional to the first and second wall 210, 220, when as necessary and suitable. Further, the attachment sleeve 100 may be in the shape of a cylinder such that one or more walls such as the first, second, third and fourth walls 210, 220, 230, 240 may each include a curved portion. In this design, the attachment sleeve 100 may be of an oval or a circle in cross-section. Each of the first and second walls 210, 220 may be a segment of the oval or circle positioned next to each other and extending in different directions with the angle α1 defined there-between.

The article 280 may be an overhead light box as depicted in FIG. 1 and FIG. 2. It should be appreciated that the article 280 may be of any suitable structures with any suitable uses. Non-limiting examples of the article 280 may include a switch, a hook and an electronic device.

The base depicted in FIG. 1 and FIG. 2 may be a vehicle overhead trim. It should be appreciated that the base 190 may be of any other interior or exterior surfaces and/or trims of a vehicle, or in other instances be of any trims or surfaces of an environment other than a vehicle such as airplane, a water vessel, a motorcycle or a house interior.

Embodiments described herein are exemplary and not meant to be limiting. One skilled in the art will readily recognize from such discussion, and from the accompanying drawings and claims that various changes, modifications and variations can be made therein without departing from the true spirit and fair scope of the invention as defined by the following claims.

What is claimed is:

1. An attachment sleeve to attach an article to a base, comprising:
   first and second walls connected to each other with a first wall angle there-between;
   a first connector extending from the first wall and including a first head, a first foot and a first neck positioned there-between along a depth direction; and
   a second connector extending from the second wall and including a second head, a second foot and a second neck positioned there-between along the depth direction,
   wherein the first neck is more bendable than the second neck.

2. The attachment sleeve of claim 1, wherein the first head is of a first head angle relative to the first foot when the attachment sleeve is at a first operating position, and the first head is of a second head angle relative to the first foot when the attachment is at a second operating position, the first head angle being different from the second head angle.

3. The attachment sleeve of claim 1, wherein the first neck is smaller in cross-sectional dimension relative to at least one of the first foot and the first head.

4. The attachment sleeve of claim 1, wherein the first head is spaced apart from the base at a first operating position and contacts the base at a second operating position.

5. The attachment sleeve of claim 4, wherein the base is partially received between the first head and the first foot when the first head is at the second operating position.

6. The attachment sleeve of claim 1, wherein the first neck includes a thermoplastic material.

7. The attachment sleeve of claim 1, wherein the first wall angle is greater than zero and no more than 90 degrees.

8. The attachment sleeve of claim 1, further comprising a third wall connected to the second wall and with a second wall angle there-between, a third connector extending from the third wall and including a third head, a third foot and a third neck positioned there-between along the depth direction, the third neck being more bendable than the second neck.

9. The attachment sleeve of claim 8, wherein the third head is of a third head angle relative to the third foot when the attachment sleeve is at a first operating position, and the third head is of a fourth head angle relative to the third foot when the attachment sleeve is at a second operating position, the third head angle being different from the fourth head angle.

10. The attachment sleeve of claim 8, wherein the second wall angle is greater than zero and no more than 90 degrees.

11. The attachment sleeve of claim 1, further comprising a fourth wall connected to the first wall with a fourth wall angle there-between, the fourth wall defining thereupon a recess to receive a nose of the article and therefore to support the article.

12. The attachment sleeve of claim 1, wherein the first head, the first neck and the first foot are each a part of an integral one-piece.

13. The attachment sleeve of claim 1, wherein the first head, the first neck, the first foot and the first wall are each a part of an integral one-piece.

14. The attachment sleeve of the claim 1, further comprising a bending enabler contacting the first neck to effectuate a positional change between a first operating position and a second operating position.

15. The attachment sleeve of the claim 1, wherein at least one of the first and second walls includes a curved portion.

16. A vehicle interior trim attachment sleeve assembly, comprising:
   an interior trim base;
   first and second walls connected to each other with a first wall angle there-between;
   a first connector extending from the first wall and including a first head, a first foot and a first neck positioned there-between along a depth direction; and
   a second connector extending from the second wall and including a second head, a second foot and a second neck positioned there-between along the depth direction, the first neck being more bendable than the second neck,
   wherein the first head being spaced apart from the interior trim base at a first operating position and contacting the interior trim base at a second operating position, the interior trim base being partially received between the first head and the first foot when the first head is at the second operating position.

17. The vehicle interior trim attachment sleeve assembly of claim 16, wherein the first head is of a first head angle relative to the first foot at the first operating position, and the first head is of a second head angle relative to the first foot at the second operating position, the first head angle being different from the second head angle.

18. The vehicle interior trim attachment sleeve assembly of claim 16, wherein the first neck includes a thermoplastic material.

19. The vehicle interior trim attachment sleeve assembly of claim 16, wherein the first head, the first neck and the first foot are each a part of an integral one-piece.

20. The vehicle interior trim attachment sleeve assembly of claim 16, wherein the first head, the first neck, the first foot and the first wall are each a part of an integral one-piece.

* * * * *